July 2, 1935. B. E. SHLESINGER 2,006,750
METHOD AND APPARATUS FOR CUTTING GEARS
Filed March 10, 1933
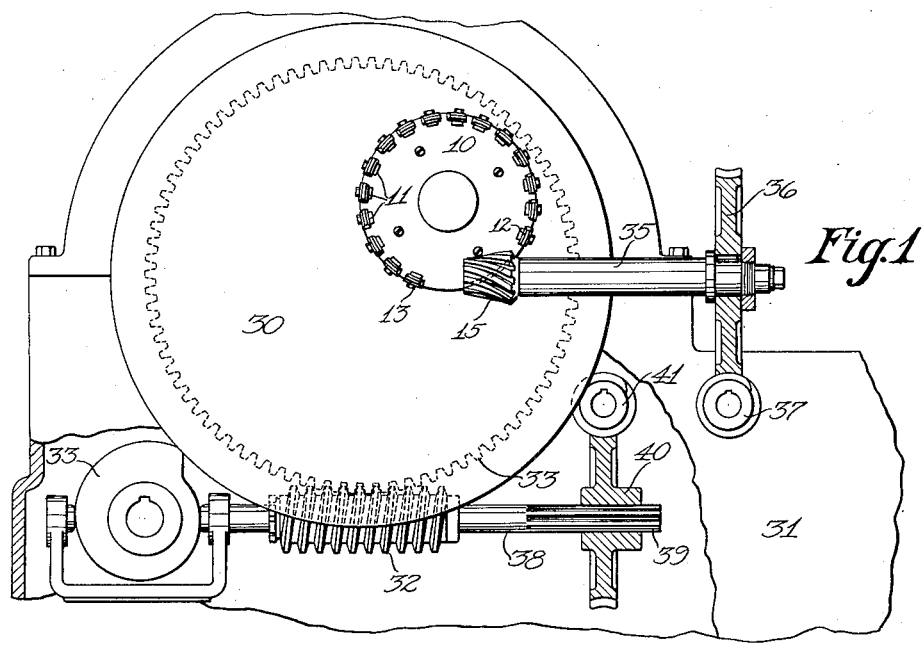
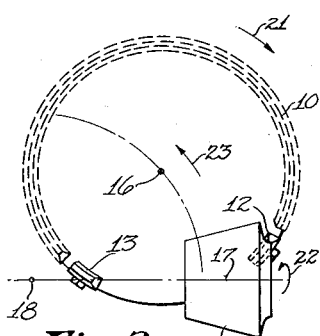
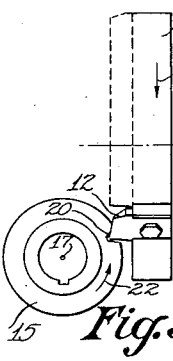
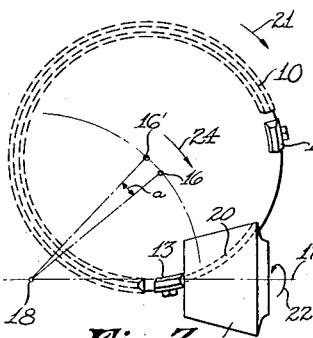
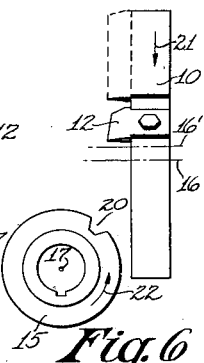
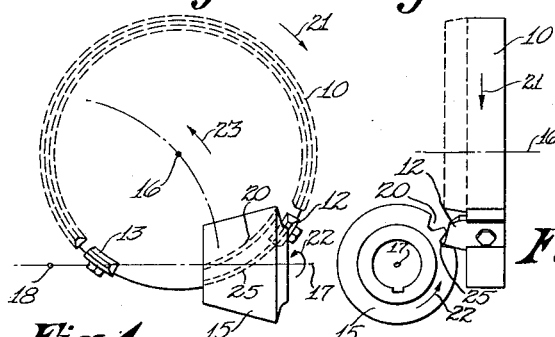
Inventor
B. E. Shlesinger Patented July 2, 1935

2,006,750

UNITED STATES PATENT OFFICE 2,006,750

METHOD AND APPARATUS FOR CUTTING GEARS

Bernard Edward Shlesinger, Irondequoit, N. Y., assignor to Gleason Works, Rochester, N. Y., a corporation of New York Application March 10, 1933, Serial No. 660,281

11 Claims. (Cl. 90—4)

The present invention relates to methods and apparatus for cutting longitudinally curved tooth gears and particularly to a method and apparatus for cutting longitudinally curved tooth tapered gears, such as spiral bevel and hypoid gears, with a tool of the face-mill type.

Longitudinally curved tooth gears can be cut with reciprocating tools or with face mills. For production work, the face-mill is the tool usually employed and the method of cutting is an intermittent indexing process. The cutter has a plurality of equi-spaced, annularly arranged cutting blades. It is alternately fed into and withdrawn from engagement with the blank. During the periods of feed, a tooth surface of a pair of tooth surfaces of the blank are completely cut and during the periods of withdrawal, the blank is indexed. The cutting operation is completed when the blank has been indexed through one revolution.

At different times, efforts have been made to cut longitudinally curved tooth gears with face mills in a continuous indexing process. A continuous indexing process offers theoretically several advantages. Tool-wear and the heat generated by the friction of cutting are distributed evenly over all the teeth of the blank, for all the teeth are being operated on simultaneously, and theoretically better tooth-spacing should result. Moreover, the time lost through indexing and indexing withdrawals is eliminated. While reciprocating tools have been employed successfully in a continuous indexing process where provision has been made to compensate for the variable motion of the tool under actuation of the crank, no satisfactory method has heretofore been devised for cutting longitudinally curved tooth gears with a face-mill in a continuous indexing process. The difficulty has been to secure a satisfactory form of cutting tool.

In a continuous indexing process, the blank is rotating continuously and it rotates away from one side of a cutting blade and into the other side of that blade as the blade moves across the face of the blank. This causes the cutting clearance or angle between the sides of the blade and the tooth surfaces being cut thereby to change continuously as the cutting blade moves across the face of the blank. Hence, with any previously known continuous indexing process, a standard face mill cutter could not be employed. Various other forms of face-mill cutters which have been suggested, have not proved practical. Thus, cutters have been made with blades whose rear ends have been offset with reference to their cutting edges so as to secure the proper cutting clearance, cutters have been made with blades similar to standard cutting blades but of higher pressure angle, etc. In the type of cutter first mentioned, the blades must be adjusted radially after sharpening and as against the standard face mill cutter in which no adjustment of the blades is required, this has constituted a decisive disadvantage. In the second type of cutter mentioned, there is too much clearance on one side of the blade and gears of standard pressure angle cannot be produced. Other objections apply to other types of continuous indexing cutters and so the continuous indexing process has never come into commercial use.

The primary purpose of the present invention is to provide a gear cutting process which possesses all the advantages of the continuous indexing process so far as accuracy of tooth spacing, distribution of tool wear and of the frictional heat of cutting are concerned and in which a practical form of face-mill can be employed. The invention is also applicable, however, to the cutting of gears with a reciprocating tool where the tool is swung in a curved path to produce the lengthwise tooth shape.

A face-mill cutting tool made for use in the present method has blades of exactly the same type as are used in the standard face mill gear cutter of the intermittent indexing process. The only difference is that the blades are arranged only part-way around the circumference of the cutter. If a single series of blades are employed, there is a relatively large space between the first and last blades of the series, while if the blades are arranged in more than one series, there is a much larger space between the last blade of each series and the first blade of the next series than there is between adjacent blades of a series.

The invention will be described particularly in connection with the cutting of gears with a face-mill. In this case, both the cutter and blank are rotated continuously in engagement and simultaneously a to and fro motion of translation is imparted between them. While a series of blades of the cutter are passing through a tooth space of the blank, the motion of translation is in one direction. When the blank-space between two series of blades or between the first and last blades of the cutter is adjacent the gear blank, the motion of translation is in the opposite direction. While the series of blades are passing through the tooth space of the blank, the motion of translation acts to compensate for or counteract the rotary motion of the blank and maintain a uniform angle of clearance between the cutting blades and gear blank as the blades move across the face of the blank, while, during the return translatory movement, the continued rotation of the blank operates to index the blank so that when the first blade of the next series or the first blade of the cutter rotates into position to cut, it will enter a new tooth space of the blank.

No new equipment is required to manufacture the blades of the face-mill cutter used in the present invention. They are of standard form, and they do not require adjustment after sharpening. The present invention has the advantage over the intermittent indexing process that no periodic movement of withdrawal between the cutter and blank are required for indexing, the indexing mechanism itself can be eliminated, and, as above indicated, all of the tooth spaces of the blank are operated on simultaneously.

In the drawing:

Figure 1 is a view illustrating diagrammatically the principal constructional features of one possible form of machine for cutting gears with a face-mill according to the present invention;

Figures 2, 3 and 4 are side elevational views illustrating diagrammatically three successive steps in the cutting of a gear with the face-mill; and Figures 5, 6 and 7 are end views of the cutter and blank, corresponding, respectively, to Figures 2, 3 and 4.

10 designates the cutting tool. This is provided with a plurality of circularly-arranged cutting blades 11 which are identical with the blades of a standard face mill gear cutter of the intermittent indexing type such as shown, for instance, in the patent to James E. Gleason No. 1,236,834 of August 14, 1917. Instead of being arranged all the way around the periphery of the cutter head, as is the case in the tool of the Gleason patent, the blades of the cutter 10 are arranged only part way around the periphery of the cutter head. There is a relatively large blank space between the last and first blades, 13 and 12, respectively, of the cutter. The blades between the blades 12 and 13 are equally spaced from one another and there is no restriction as to their number as long as the necessary cutting clearance is provided between successive blades.

The gear blank to be cut is designated at 15. In Figure 1 practically all the teeth of the blank have been cut, but the other figures show the blank at the beginning of the cutting operation.

In the cutting operation, the cutter and blank are brought into engagement and rotated continuously on their respective axes 16 and 17. Simultaneously there is a relative movement of to and fro translation produced between the cutter and the blank. This to and fro motion is timed to the rotation of the cutter and, during cutting, to the rotation of the blank. For any tapered gear, the translatory movement will be about an axis angularly disposed to the axis of the blank and for a spiral bevel gear, the axis about which the translatory movement takes place will ordinarily intersect the blank axis in the blank apex, that is, the translatory movement will be an angular movement about the blank apex. This is the case shown in the drawing, where the gear 15 being cut is a spiral bevel gear and the axis 18 about which the translatory movement takes place intersects the axis 17 of the blank in the blank apex.

Figures 2 and 5 show the cutter 10 beginning to cut in the first tooth space 20 of the blank. The first blade 12 of the cutter is just taking its cut. The cutter is rotating in the direction indicated by the arrow 21, while the blank is rotating in the direction indicated by the arrow 22. The cutter and blank continue to rotate in these respective directions throughout the whole of the cutting operation. As the cutter rotates on from the position shown in Figures 2 and 5, moving the blades, which follow the blade 12, through the blank, the cutter is swung relative to the blank about the axis 18 and in the direction indicated by the arrow 23. The rate of the swinging movement, as the blades cross the blank, is equal to the speed of rotation of the blank so that as each blade of the cutter crosses the face of the blank the cutter and blank roll together. The result is that there is a uniform cutting clearance maintained during cutting between the blades and the side or sides of the tooth or teeth being cut thereby. When the last blade 13 of the cutter has passed through the tooth space 20 of the blank, as is shown in Figure 3, the cutter will have been swung in its translatory movement about the axis 18 through an angle $a$ and the axis 16 of the cutter will have been carried to the position 16'.

The blank-space of the cutter is now abreast of the gear blank, as clearly shown in Figures 3 and 6. The cutter and gear blank continue to rotate in the direction of the arrows 21 and 22, respectively, but, as soon as the last blade 13 of the cutter has cleared the blank, the translatory motion is reversed and the cutter is swung back about the axis 18 to return it to its initial position. The return translatory movement of the cutter is indicated by the arrow 24 in Figure 3.

The continued rotation of the gear blank during the time that the blank-space of the cutter is abreast of it causes the gear blank to be indexed. During the return swing of the cutter about the axis 18, the cutter will be carried back to its initial position corresponding to that of Figure 2 and when the blade 12 again commences to cut, the gear blank will have rotated far enough, as shown in Figures 4 and 7, so that the blade 12 will enter a new tooth space 25 of the gear blank. At this moment, the swinging movement of the cutter will again be reversed so that as the blades of the cutter once more pass across the blank, the swinging movement will again be in the direction of the arrow 23.

From the preceding description, it will be seen that there is a complete oscillation of the cutter about the axis 18 for each revolution of the cutter 10 and that on each revolution of the cutter, the blades operate in a new tooth space of the blank. When the blank has made a complete revolution, the cutter will have made a series of cuts on each tooth of the blank corresponding in number to the number of blades in the cutter.

After a cut around on all the tooth spaces of the blank, the tool will be fed into the blank so that on the next cut around, it will remove further stock. The feed may be effected by a step-cam, for instance, or, if the tooth profiles of the blank are being generated, the feed may be effected by a step-by-step actuation of the generating mechanism after each revolution of the blank.

Figure 1 illustrates diagrammatically how a spiral gear cutting machine might be built or modified to practice the present invention. The cutter 10 is journaled in a rotary cradle 30 and may be adjustable thereon in the usual manner to produce the correct spiral angle and pressure angle on the teeth of the blank. These adjustments have not been shown for reasons of simplification. The cradle is mounted in a full-circular bearing in the frame 31 of the machine. It is oscillated to impart the required translatory movement to the cutter by reciprocation of a worm 32 which meshes with a wormwheel 33 that is secured to the cradle.

The worm 32 is reciprocated by a cam 33. This produces an oscillatory motion of the cutter about the axis of the cradle corresponding to the translatory motion about the axis 18 already described. The cam 33 will be driven in time with the cutter rotation through any suitable mechanism, the cam making one revolution for each revolution of the cutter shown. If the blades of the cutter are arranged in more than one series, then a cam of the type shown would be geared to the cutter to make a number of revolutions during each revolution of the cutter equal to the number of series of blades in the cutter.

The gear to be cut is secured to the work spindle 35 of the machine which is rotated by the worm wheel 36 and worm 37 in time with the cam and cutter rotations.

When the cam is so formed as to provide a quick-return motion of the cradle, the blades can be arranged around the greater portion of the periphery of the cutter, as shown. Were the cam made so that the return motion was at the same rate as the forward motion, the blades would have to be arranged only half way around the cutter and the remaining half of the cutter would be blank.

If the tooth surfaces of the gear 15 are to be generated, the generating motion can be produced by imparting preferably a step-by-step rotation to the worm 32. For this purpose, the shaft 38, to which the worm is secured may be splined, as indicated at 39 and on the splined portion of the shaft there may be mounted a worm wheel 40. This worm wheel may be rotated by a worm 41 and the worm may be rotated intermittently, that is, after each revolution of the blank, by any suitable mechanism. Rotation of the worm shaft 38 and worm 32 through the mechanism just described will impart a rotary movement to the worm wheel 33 and cradle 30 which will combine with the oscillatory motion received from the cam 33 and will produce the generating action through the timed rotation of the work. The splining of the shaft 38 permits of its rotation without interference with its reciprocation.

While the cradle 30 must swing back and forth once for each revolution of the cutter if there are only one series of blades in the cutter and more often if there are a plurality of series of blades in the cutter, the amount of its swing is much less than the amount of swing of the cradle in a machine operating according to the intermittent indexing process. In the intermittent indexing process, the cutter rotates a very large number of times in generating a tooth space, but the swing of the cradle during the cutter rotation is through an angle large enough to roll out the tooth profile and usually is through several circular pitches of the blank. In the present invention, the cradle will be swung through less than one circular pitch. Therefore, while there are fewer blades in a cutter used in the present invention than in a cutter employed in an intermittent indexing operation, the cradle can be swung back and forth faster in the present invention than in an intermittent indexing process and one factor compensates for the other so that the method of the present invention need not be slower than an intermittent indexing process.

By spacing the blades of the cutter far enough apart it would be possible to swing the cradle back and forth between the operation of successive blades or successive pairs of blades. Thus, successive blades or successive pairs of blades of the cutter could be made to enter successive tooth spaces of the blank as the cutter and blank rotate together. Going a step further, then, it will be seen that instead of using a rotating motion to carry the cutting blades across the face of a gear blank, a reciprocating motion in a longitudinally curved path might be employed instead and a single tool used. In this case, the cradle would have a to and fro motion with each reciprocation of the tool and the tool would cut on successive cutting strokes in successive tooth slots of the blank. During the non-cutting or return strokes of the tool, the tool would be swung clear of the blank, as in the usual practice, and it would be during these return strokes that the cradle would be returned to initial position.

In the preceding description, the oscillatory and feed motions have been described as being imparted to the cutter. It will be readily understood, however, that they might be imparted instead to the work.

The invention has been described in connection with the cutting of spiral bevel gears but it will be readily understood that it is applicable also to the cutting of spur and hypoid gears. In general, it may be said that the present application is intended to cover any adaptations, uses, or embodiments of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of cutting longitudinally curved tooth gears which comprises rotating a face mill, which has a plurality of blades arranged part-way around its periphery only, in operative relation with a continuously rotating gear blank, while producing a back and forth movement of translation between the cutter and blank in time with the cutter rotation.

2. The method of cutting a longitudinally curved tooth gear which comprises employing a face mill, which has a plurality of blades arranged around its periphery in one or more groups with a space between the last blade of one group and the first blade of another, and rotating said cutter continuously in engagement with a continuously rotating gear blank while producing a back and forth movement of translation between the cutter and gear blank, said translatory movement being in timed relation with the gear blank rotation while a group of blades are passing through a tooth space of the gear blank, and operating to return the cutter to initial position while a blank space of the cutter is abreast of the gear blank.

3. The method of cutting longitudinally curved tooth gears which comprises employing a face mill, which has a plurality of blades arranged part-way around its periphery only, and rotating said cutter continuously in operative relation with a continuously rotating gear blank while producing a back and forth movement of translation between the cutter and blank so timed that during each revolution of the cutter, one complete cycle of the translatory motion occurs.

4. The method of cutting longitudinally curved tooth gears which comprises employing a face mill, which has a plurality of blades arranged around its periphery in one or more groups with a blank space between the last and first blades of the group or groups, and rotating said cutter continuously in engagement with a continuously rotating gear blank while producing a relative translatory movement between the cutter and blank about an axis angularly disposed to the axis of the blank, said translatory motion being timed to the blank rotation while a group of blades of the cutter are passing through a tooth space of the blank and acting to return the cutter to initial position while a blank space of the cutter is abreast of the gear blank.

5. In a machine for producing gears, a rotatable work support, a rotary face mill cutter, a carrier on which one of said parts is mounted, said cutter having a plurality of blades arranged in one or more groups around its periphery with a blank space between the last and first blades of the group or groups, means for rotating the cutter and work support continuously on their respective axes, and means for imparting a back and forth movement of translation to the carrier so timed that during movement of the carrier in one direction, a group of blades of the cutter is passing through a tooth space of the gear blank and during movement of the carrier in the opposite direction, a blank space of the cutter is abreast of the gear blank.

6. In a machine for producing gears, a rotatable work support, a rotary face mill cutter, an oscillatory cradle upon which one of said parts is mounted, said cutter having a plurality of blades arranged in one or more groups around its periphery with a blank space between the last and first blades of the group or groups, means for rotating said cutter and work support continuously on their respective axes, and means for imparting an oscillatory movement to the cradle so timed that during movement of the cradle in one direction, a group of blades of the cutter is passing through a tooth space of the blank, and during movement of the cradle in the opposite direction, a blank space of the cutter is abreast of the gear blank.

7. The method of producing a longitudinally curved tooth gear which comprises actuating a cutting tool to move the tool in a longitudinally curved path across the face of a continuously rotating gear blank and then return the tool to cutting position, and simultaneously imparting a back and forth movement of translation between the tool and blank, the forward motion of translation being at the same rate as the blank rotation during cutting, and the return motion taking place while the tool is clear of the blank, so that, by reason of the continuous rotation of the blank, the tool will enter a different tooth space of the blank each time it cuts.

8. In a machine for producing longitudinally curved tooth gears, a work support, a face mill cutter having a plurality of arcuately arranged blades extending part-way around its periphery only with a gap between the last and the first blades which is of greater angular extent than the distance between successive blades, means for rotating the cutter, and means for producing a relative movement between the cutter and work support while the gap in the cutter is abreast of the work to cause the blades of the cutter to enter a different tooth space of the blank on each revolution of the cutter.

9. The method of cutting longitudinally curved tooth gears which comprises rotating a face mill gear cutter, which has a plurality of arcuately arranged blades extending part-way around its periphery only so that there is a gap between the last and first blades of the cutter which is of greater angular extent than the distance between successive blades, in operative relation with a gear blank and effecting a relative movement between the cutter and blank while the gap in the cutter is abreast of the blank to cause the blades of the cutter to enter a different tooth space of the blank on each revolution of the cutter.

10. The method of producing a longitudinally curved tooth gear which comprises actuating a cutting tool to move it in a longitudinally curved path across the face of a continuously rotating gear blank and then return the tool to cutting position, and simultaneously imparting a relative oscillating movement to the tool and blank about an axis angularly disposed to the axis of the blank, the forward motion of oscillation being timed to the blank rotation during cutting and the return motion of oscillation taking place while the tool is clear of the blank so that by reason of the continuous rotation of the blank, the tool enters a different tooth space of the blank each time it cuts.

11. The method of cutting a longitudinally curved tooth gear which comprises employing a face-mill gear cutter having a plurality of blades arranged thereon in an arc concentric with the cutter axis with at least two successive blades spaced for successive engagement with corresponding side tooth surfaces of different teeth of a blank, each of said blades being so relieved that all points in a top cutting edge of the blade are at the same radial distance from the axis of the cutter, and rotating said cutter continuously in one direction in operative relation with a gear blank while rotating the blank continuously in one direction and simultaneously producing a relative to and fro motion of translation between the cutter and blank which is timed to the blank rotation during passage of blades across the face of the blank and in which the return motion occurs while the space between blades, which are arranged to engage successive teeth, is abreast of the blank.

B. E. SHLESINGER.